United States Patent [19]

Riew

[11] 4,088,708

[45] May 9, 1978

[54] THERMOPLASTIC, THERMOSETTING ELASTOMERIC COMPOSITIONS AND METHODS FOR MAKING THE SAME

[75] Inventor: Changkiu Keith Riew, Akron, Ohio

[73] Assignee: The B. F. Goodrich Company, Akron, Ohio

[21] Appl. No.: 660,655

[22] Filed: Feb. 23, 1976

Related U.S. Application Data

[63] Continuation-in-part of Ser. No. 586,723, Jun. 13, 1975, abandoned.

[51] Int. Cl.$^2$ ............................................. C08L 63/00
[52] U.S. Cl. ................................. 260/836; 260/830 P; 428/414; 526/335; 526/338
[58] Field of Search .......................................... 260/836

[56] References Cited

U.S. PATENT DOCUMENTS

| | | | |
|---|---|---|---|
| 3,285,949 | 11/1969 | Siebert | 260/465.4 |
| 3,673,275 | 6/1972 | Simms | 260/837 R |
| 3,686,359 | 8/1972 | Soldatos | 260/836 |
| 3,707,583 | 12/1972 | McKown | 260/837 |
| 3,823,107 | 7/1974 | Cotton | 260/837 R |
| 3,853,815 | 12/1974 | Lubowitz | 260/836 |
| 3,894,113 | 7/1975 | Pagel | 260/837 R |
| 3,926,903 | 12/1975 | Scola | 260/42.28 |
| 3,926,904 | 12/1975 | Scola | 260/42.28 |
| 3,966,837 | 6/1976 | Riew et al. | 260/837 R |

FOREIGN PATENT DOCUMENTS

1,815,632  7/1969  Germany ............................. 260/836

OTHER PUBLICATIONS

Drake, R. S. & McCarthy, W. J. Liquid Butadiene/Acrylonitrile Copolymers with Reactive Terminals, Rubber World, Oct., 1968.

*Primary Examiner*—Paul Lieberman
*Attorney, Agent, or Firm*—Charles A. Crehore

[57] ABSTRACT

Compositions may be reacted partially to a thermoplastic, elastomeric intermediate stage (B-stage) having excellent shelf stability at room temperature. The thermoplastic (B-stage) compositions may be heated to cure to a thermoset, elastomeric, tack-free final stage (C-stage). The compositions comprise (A) 1 equivalent weight of at least one cycloaliphatic epoxy resin, (B) from about 0.05 to about 0.5 equivalent weight of at least one amine-terminated liquid polymer having a carbon-carbon backbone and (C) from about 0.4 to about 1.5 equivalent weight of at least one anhydride. The compositions are useful as solventless adhesives (alone or compounded with rubber stock or the like) for conveyor belts, hoses, shoes, iron-on clothing patches, and the like. The compositions are also useful as paints, powder coatings, binders for woven or non-woven fibers and cords, and the like.

50 Claims, No Drawings

THERMOPLASTIC, THERMOSETTING ELASTOMERIC COMPOSITIONS AND METHODS FOR MAKING THE SAME

CROSS REFERENCE TO RELATED APPLICATION

This is a continuation-in-part of my co-pending application Ser. No. 586,723 filed June 13, 1975 now abandoned.

BACKGROUND OF THE INVENTION

Prior art such as U.S. Pat. No. 3,340,224 teaches preparation of B-stage adhesives. New B-stage adhesive composition are desired.

SUMMARY OF THE INVENTION

Compositions curable to a thermoplastic, elastomeric intermediate stage and thereafter via a molten state to a thermoset, elastomeric tack-free final stage comprise (A) 1 equivalent weight of at least one cycloaliphatic epoxy resin, (B) from about 0.05 to about 0.5 equivalent weight of at least one amine-terminated liquid polymer having a carbon-carbon backbone and (C) from about 0.4 to about 1.5 equivalent weight of at least one anhydride.

DETAILED DESCRIPTION

Amine-Terminated Liquid Polymers

The amine-terminated liquid polymers suitable as component (B) in the compositions of this invention have the formula

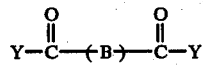

wherein Y is a univalent radical obtained by removing a hydrogen from an amine group of an aliphatic, alicyclic, heterocyclic or aromatic amine containing at least two amine groups, at least two of which are primary and/or secondary amine groups. B is a polymeric backbone comprising carbon-carbon linkages. Generally the carbon-carbon linkages comprise at least about 90% by weight of total polymeric backbone weight, more preferably at least about 95% by weight of total polymeric backbone weight. The amine-terminated polymers contain an average from about 1.7 to about 3 primary and/or secondary amine groups per molecule, more preferably from about 1.7 to about 2.3 primary and/or secondary amine groups per molecule. The amine-terminated polymers may have Brookfield viscosities (measured using a Brookfield RVT viscometer at 27° C.) from about 500 cps. to about 2,500,000 cps., more preferably from about 500 cps. to about 500,000 cps.

The amine-terminated liquid polymers can be prepared easily by reacting a carboxyl-terminated or ester-terminated liquid polymer having a carbon-carbon backbone with at least one aliphatic, alicyclic or heterocyclic amine containing at least two amine groups, at least two of which are primary and/or secondary amine groups. Amine-terminated liquid polymers can also be prepared easily by reacting an acid chloride-terminated liquid polymer having a carbon-carbon backbone with at least one aliphatic, alicyclic, heterocyclic or aromatic amine containing at least two amine groups, at least two of which are primary and/or secondary amine groups.

The carboxyl-terminated liquid polymers used may have Brookfield viscosities from about 500 cps. to about 500,000 cps., more preferably from about 500 cps. to about 250,000 cps., and have polymeric backbones comprising carbon-carbon linkages. The carboxyl functional groups are located at least at the ends of a polymer molecule, but there may also be additional group(s) located pendant to a polymer backbone. The average number of total carboxyl groups typically may be from about 1.7 to about 3 groups per molecule, more preferably from about 1.7 to 2.3 groups per molecule.

Carboxyl-terminated liquid polymer having carbon-carbon backbone linkages may contain polymerized units of at least one vinylidene monomer having at least one terminal $CH_2=C<$ group and selected from the group consisting of (a) monoolefins containing 2 to 14 carbon atoms, more preferably 2 to 8 carbon atoms, such as ethylene, propylene, isobutylene, 1-butene, 1-pentene, 1-hexene, 1-dodecene and the like; (b) dienes containing 4 to 10 carbon atoms, more preferably 4 to 8 carbon atoms, such as butadiene, isoprene, 2-isopropyl-1,3-butadiene, chloroprene, and the like; (c) vinyl and allyl esters of carboxylic acids containing 2 to 8 carbon atoms such as vinyl acetate, vinyl propionate, allyl acetate, and the like; (d) vinyl and allyl ethers of alkyl radicals containing 1 to 8 carbon atoms such as vinyl methyl ether, allyl methyl ether, and the like; and (e) acrylic acids and acrylates having the formula

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical containing 2 to 12 carbon atoms, more preferably 2 to 8 carbon atoms. Even more preferably $R^1$ is hydrogen or an alkyl radical containing 1 to 8 carbon atoms. Examples of suitable acrylates include ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, methyl methacrylate, ethyl methacrylate, octyl methacrylate and the like. Often two or more types of these polymerized monomeric units are contained in the polymeric backbone More preferred liquid polymers contain polymerized units of at least one vinylidene monomer having at least one terminal $CH_2=C<$ group and are selected from the group consisting of (a) monoolefins containing 2 to 14 carbon atoms, more preferably 2 to 8 carbon atoms; (b) dienes containing 4 to 10 carbon atoms, more preferably 4 to 8 carbon atoms; and (e) acrylic acids and acrylates having the formula

wherein R is hydrogen or an alkyl radical containing 1 to 3 carbon atoms and $R^1$ is hydrogen or an alkyl radical containing 1 to 18 carbon atoms, more preferably 1 to 8 carbon atoms, or an alkoxyalkyl, alkylthioalkyl, or cyanoalkyl radical contaning 2 to 12 carbon atoms, more preferably 2 to 8 carbon atoms. Even more preferably $R^1$ is hydrogen or an alkyl radical containing 1 to 3 carbon atoms. Excellent results may be obtained with dienes containing 4 to 10 carbon atoms, more preferably 4 to 8 carbon atoms, particularly butadiene.

The vinylidene monomers described above may be polymerized readily with from 0% up to about 50% by weight, more preferably from 0% up to about 35% by weight, of at least one comonomer selected from the group consisting of (f) vinyl aromatics having the formula

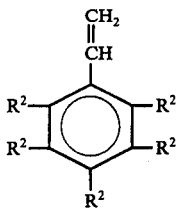

wherein $R^2$ is hydrogen, halogen or an alkyl radical containing from 1 to 4 carbon atoms, such as styrene, α-methyl styrene, chlorostyrene, vinyl toluene, and the like; (g) vinyl nitriles having the formula

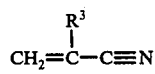

wherein $R_3$ is hydrogen or an alkyl radical containing 1 to 3 carbon atoms, such as acrylonitrile, methacrylonitrile and the like; (h) vinyl halides such as vinyl bromide, vinyl chloride and the like; (i) divinyls and diacrylates such as divinyl benzene, divinyl ether, diethylene glycol diacrylate, and the like; (j) amides of α,β-olefinically unsaturated carboxylic acids containing 2 to 8 carbon atoms such as acrylamide and the like; and (k) allyl alcohol and the like. Liquid polymer compositions comprising polymerized units of a major amount of at least one vinylidene monomer listed in (a) to (e) with a minor amount of at least one comonomer listed in (f) to (k) are within the scope of this invention.

More preferred comonomers may be selected from the group consisting of (f) vinyl aromatics having the formula

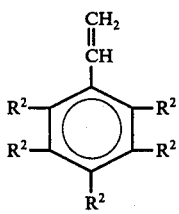

wherein $R^2$ is selected from the group consisting of hydrogen, halogen and alkyl radicals containing 1 to 4 carbon atoms; and (g) vinyl nitriles having the formula

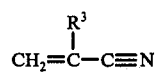

wherein $R^3$ is hydrogen or an alkyl radical containing 1 to 3 carbon atoms. Excellent results were obtained using styrene and acrylonitrile.

Examples of useful liquid polymeric backbones comprising carbon-carbon linkages include polyethylene, polyisobutylene, polyisoprene, polyutadiene, poly(vinyl ethyl ether), poly(ethyl acrylate) and poly(butyl acrylate) as well as copolymers of butadiene and acrylonitrile; butadiene and styrene; vinyl acetate and isoprene; vinyl acetate and chloroprene; vinyl ethyl ether and diallyl ether; vinyl ethyl ether and α-methyl styrene; vinyl ethyl ether and vinyl bromide; methyl acrylate and butadiene; methyl acrylate and ethyl acrylate; methyl acrylate and butyl acrylate; methyl acrylate and 2-ethyl hexyl acrylate; ethyl acrylate and ethylene; ethyl acrylate and isobutylene; ethyl acrylate and isoprene; ethyl acrylate and butadiene; ethyl acrylate and vinyl acetate; ethyl acrylate and styrene; ethyl acrylate and chlorostyrene; ethyl acrylate, styrene and butadiene; ethyl acrylate and n-butyl acrylate; ethyl acrylate, n-butyl acrylate and 2-ethylhexyl acrylate; ethyl acrylate and vinyl bromide; ethyl acrylate and acrylic acid; ethyl acrylate and acrylamide; ethyl acrylate and allyl alcohol; butyl acrylate, styrene and isoprene, butyl acrylate and styrene; butyl acrylate and acrylonitrile; butyl acrylate and vinyl chloride; and the like.

Liquid carboxyl-terminated polymers may be prepared by free-radical polymerization using carboxyl-containing initiators and/or modifiers as disclosed in U.S. Pat. No. 3,285,949 and German Pat. No. 1,150,205 and by solution polymerization using lithium metal or organo-metallic compounds and post-treating the polymers to form carboxyl groups as disclosed in U.S. Pat. No. 3,135,716 and 3,431,235. The polymers can also be prepared by reacting liquid polymers having other than terminal carboxyl groups with compounds so as to yield carboxyl groups. For example, liquid carboxyl-terminated polymers can be prepared from liquid hydroxyl-terminated polymers by reaction with dicarboxylic acids or their anhydrides. Liquid halogen-terminated polymers can be reacted with unsaturated anhydrides in the presence of Lewis acids to yield carboxyl groups. Thus, it is seen that the method of preparing the liquid carboxyl-terminated polymer is not critical to the invention. The essential features of the polymer are that it have at least terminal carboxyl groups and a polymeric backbone of carbon-carbon linkages.

Examples of preferred liquid carboxyl-terminated polymers include carboxyl-terminated polyethylene, carboxyl-terminated polyisobutylene, carboxyl-terminated polybutadiene, carboxyl-terminated polyisoprene, carboxyl-terminated poly(ethyl acrylate), as well as carboxyl-terminated copolymers of butadiene and acrylonitrile and of butadiene and styrene. Carboxyl-terminated copolymers of butadiene with acrylonitrile or styrene were found to be especially useful. These polymers may contain from about 50% to about 99.6% by weight of butadiene, from about 0% to about 40% by weight of acrylonitrile or styrene and from about 0.4% to about 10% by weight of carboxyl, based upon the total weight of polymer.

The carboxyl-terminated liquid polymers can be esterified with an aliphatic monohydric alcohol by methods well known to the art in order to produce ester-terminated liquid polymers. For example, a carboxyl-terminated polymer and an aliphatic monohydric alcohol can be reacted in a flask or under reflux in the presence of a small amount of an acid catalyst. Suitable acid catalysts include organic acids such as monoesters and diesters of orthophosphoric acid, alkarylsulfonic acids such as p-toluenesulfonic acid, and the like; inorganic acids such as boric acid, phosphoric acid, sulfuric acid and the like; and Lewis acids such as tetraisopropyl titanate and the like. The amount of acid catalyst used may be as little as about 0.01% up to about 5% by weight based upon total reactant weight. Suitable aliphatic monohydric alcohols for use in the esterification reaction contain from 1 to 12 carbon atoms, more preferably from 1 to 6 carbon atoms, and have boiling points below about 150° C., more preferably below about 100° C. Primary aliphatic monohydric alcohols are preferred. Examples of suitable aliphatic monohydric alcohols include alkanols containing from 1 to 6 carbon atoms, such as methanol, ethanol, 1-propanol, 1-butanol, and the like. Other suitable aliphatic monohydric alcohols include 2-methoxyethanol, 2-ethoxyethanol and the like. Excellent results may be obtained using ethanol, 1-propanol or 1-butanol.

The carboxyl-terminated liquid polymers can be converted to acid chloride-terminated liquid polymers by methods well known to the art. For example, a carboxyl-terminated polymer can be reacted with thionyl chloride to produce an acid chloride-terminated polymer. HCl and $SO_2$ are evolved primarily as gases and are separated easily from the acid chloride-terminated polymer, and any excess thionyl chloride can be removed easily by vacuum distillation or by washing with a solvent such as methanol. Other suitable but less preferred acylation agents include phosphorus trichloride and phosphorus pentachloride.

Amines which react well with the carboxyl-terminated, ester-terminated and acid chloride-terminated polymers described heretofore include aliphatic amines containing from 1 to 20 carbon atoms, more preferably from 1 to 12 carbon atoms, and at least two, more preferably two, primary and/or secondary amine groups. Also suitable are alicyclic amines containing from 4 to 20 carbon atoms, more preferably from 4 to 12 carbon atoms, and at least two, more perferably two, primary and/or secondary amine groups. Heterocyclic amines may also be used which contain from 2 to 20 carbon atoms, more preferably from 2 to 12 carbon atoms, and at least two, more preferably two, primary and/or secondary amine groups. Examples of suitable amines just described include aliphatic amines such as ethylenediamine, 1,2-propanediamine, 1,3-propanediamine, 1,4-butanediamine, 2-methyl-1,2-propanediamine, 1,5-pentanediamine, 1,6-hexanediamine, 1,7-heptanediamine, 1,8-octanediamine, 1,10-decanediamine, 1,12-dodecanediamine and the like; aliphatic polyamines such as diethylenetriamine, triethylenetetramine, tetraethylenepentamine, bis(hexamethylene) triamine, 3,3'-iminobispropylamine, and the like; alicyclic diamines and polyamines such as 1,2-diaminocyclohexane, 1,8-p-menthanediamine and the like; and heterocyclic diamines and polyamines such as 4-(aminomethyl)-piperidine; piperazine; N-(aminoalkyl)-piperazines wherein each alkyl group contains from 1 to 12 carbon atoms, more preferably 1 to 6 carbom atoms, such as N-(2-aminoethyl)-piperazine, N-(3-aminopropyl)-piperazine, N,N'-bis-(3-aminopropyl)-piperazine, and the like.

More preferably the amines just described contain at least two primary and/or secondary amine groups having different reactivities. The presence of amine groups having different reactivities makes the amine-termination reaction more likely than the coupling of the liquid polymers, and a smaller amine excess may be used in order to avoid coupling. Examples of more preferred amines include some alicyclic amines such as 1,8-p-menthanediamine and the like; and some heterocyclic amines such as 4-(aminomethyl)-piperidine and N-(aminoalkyl)-piperazines wherein the alkyl group contains from 1 to 12 carbon atoms, more preferably 1 to 6 carbon atoms, such as N-(2-aminoethyl)-piperazine, N-(3-aminopropyl)-piperazine, and the like. Excellent results were obtained using N-(2-aminoethyl) piperazine.

Aromatic diamines and polyamines can be used to produce amine-terminated polymers. The high temperature required for aromatic amine reaction with carboxyl-terminated polymers may cause excessive degradation of reactants and products and is therefore much less preferred. However, aromatic amines may react well with the acid chloride-terminated polymers described heretofore. Suitable aromatic amines contain at least two primary or secondary amine groups bonded directly to at least one aromatic nucleus. Examples of suitable aromatic amines include 4,5-acenaphthenediamine, 3,5-diaminoacridine, 1,4-diaminoanthraquinone, 3,5-diaminobenzoic acid, 2,7-fluorenediamine, 1,5-naphthalenediamine, 1,8-naphthalenediamine, 2,4-toluenediamine, 2,6-toluenediamine, o-phenylenediamine, m-phenylenediamine, p-phenylenediamine and the like.

A solvent is not required for the amine-termination reaction but may be used. Mixtures of solvents may also be used. Suitable solvents include aliphatic and cycloaliphatic ethers containing from 3 to 10 carbon atoms, more preferably from 3 to 6 carbon atoms, such as tetrahydrofuran, diethylether and the like; halogenated aliphatic hydrocarbons containing from 1 to 10 carbon atoms, more preferably from 1 to 6 carbon atoms, such as chloroform, carbon tetrachloride, 1,2-dichloroethylene, trichloroethylene, tetrachloroethylene and the like; and esters containing from 3 to 10 carbon atoms, more preferably from 3 to 6 carbon atoms, such as ethyl acetate, n-butyl acetate, hexyl acetate, benzyl acetate, methyl propionate, ethyl propionate and the like. Also suitable as solvents and more preferred are aromatic compounds having the formula.

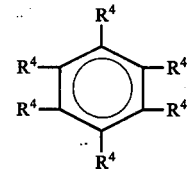

wherein $R^4$ is hydrogen, halogen or an alkyl radical containing 1 to 3 carbon atoms, and at least two $R^4$s are hydrogen. More preferably $R^4$ is hydrogen, chlorine, or an alkyl radical containing 1 to 2 carbon atoms, and at least three $R^4$s are hydrogen. Suitable aromatic solvents include benzene, chlorobenzene, toluene, o-, m- and p-xylene, o-, m- and p-diethylbenzene, cumene, mesitylene and the like.

A sufficient quantity of at least one amine described heretofore may be reacted with a carboxyl-terminated, ester-terminated or acid chloride-terminated liquid polymer described heretofore in order to produce an amine-terminated liquid polymer containing from about 1.7 to about 3 primary and/or secondary amine groups per molecule. Typically the average number of total carboxyl, ester or acid chloride groups in a liquid polymer before reaction will be from about 1.7 to about 3 groups per molecule, more preferably from about 1.7 to about 2.3 groups per molecule. In this typical case, from about 1.2 to about 6 mole equivalents and more, more preferably from about 1.2 to about 3 mole equivalents of at least one amine described heretofore can be used per mole equivalent of carboxylated, esterified or acylated liquid polymer described heretofore. However, when the carboxylated, esterified or acylated liquid polymer also contains polymerized therein appreciable amounts of acrylic acid, acrylates or the like, the amount of amine reacted should be limited so that the amine-terminated liquid polymer contains no more than an average of about 1.7 to about 3 primary and/or secondary amine groups per molecule.

No catalyst is required, and many types of mixing apparatus can be used in the amine termination reaction. For example, simple mixers can be used, including turbine stirrers as well as propeller mixers. Reaction components can be combined in any order. The reaction mixture may be heated (or refluxed if a solvent is used) at a temperature from about 80° C. to about 150° C., typically for about 1 to 6 hours. By-products may be removed by evaporation or the like as they are formed (e.g., water from the carboxyl-amine reaction, HCl from the acid chloride-amine reaction, and alcohol from the ester-amine reaction). The amine-terminated liquid polymer may be purified by vacuum distillation or by washing with a solvent such as a benzene-methanol mixture in order to remove unreacted amine, followed by drying the polymer. Amine content of the amine-terminated liquid polymers can be analyzed qualitatively by infrared spectroscopy. Amine content can also be analyzed quantitatively following the procedure described by Siggia, *Quantitative Organic Analysis via Functional Groups*, N.Y., Wiley and Sons, Inc., 1963, pp. 452–456.

CYCLOALIPHATIC EPOXY-TERMINATED LIQUID POLYMERS

Cycloaliphatic epoxy resins suitable as component (A) in the compositions of this invention include cycloaliphatic epoxy-terminated liquid polymers having the formula

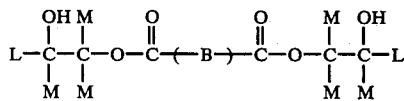

wherein L is a univalent radical obtained by removing a non-cycloaliphatic epoxy group from an epoxy resin containing at least one non-cycloaliphatic epoxy group and at least one cycloaliphatic group, more preferably one non-cycloaliphatic epoxy group and one cycloaliphatic epoxy group. In the above formula M is hydrogen or an alkyl group containing from one to four carbon atoms, preferably hydrogen, and B is as defined heretofore. By cycloaliphatic epoxy group is meant an oxirane group which is itself part of a cycloaliphatic ring structure, for example, the group

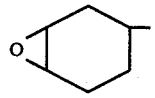

By non-cycloaliphatic epoxy group is meant an oxirane group which is not part of a cycloaliphatic ring structure, i.e., the group

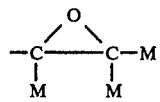

wherein M is as defined heretofore.

The epoxy-terminated liquid polymers contain an average from about 1.7 to about 3 cycloaliphatic epoxy groups per molecule, more preferably an average from about 1.7 to about 2.3 cycloaliphatic epoxy groups per molecule. The epoxy-terminated liquid polymers may have Brookfield viscosities (measured using a Brookfield RVT viscometer at 27° C.) from about 500 cps. to about 2,500,000 cps., more preferably from about 500 cps. to about 500,000 cps.

The epoxy-terminated liquid polymers can be prepared easily by reacting a carboxyl-terminated liquid polymer described heretofore with an epoxy resin containing at least one non-cycloaliphatic epoxy group and at least one cycloaliphatic epoxy group, more preferably one non-cycloaliphatic epoxy group and one cycloaliphatic epoxy group. The terminal carboxyl groups have been found to react preferably with non-cycloaliphatic epoxy groups, thereby avoiding coupling while forming a cycloaliphatic epoxy-terminated liquid polymer.

Suitable epoxy resins containing at least one non-cycloaliphatic epoxy group and at least one cycloaliphatic epoxy group include 1,2-8,9-diepoxy-p-menthane, 1,2-epoxy-6-(2,3-epoxypropoxy)hexahydro-4,7-methanoindane, p-(2,3-epoxy)cyclopentylphenyl-2,3-epoxypropyl ether, 1-(2,3-epoxypropoxy)phenyl-5,6-epoxyhexahydro-4,7-methanoindane, o-(2,3-epoxy)cyclopentylphenyl-2,3-epoxypropyl ether, 4-(1,2-epoxyethyl)-1,2-epoxycyclohexane (also called 4-vinylcyclohexene dioxide) and the like. Excellent results were obtained using 4-vinylcyclohexene dioxide to produce a cycloaliphatic epoxy-terminated liquid polymer, identified as ETBN and having the formula

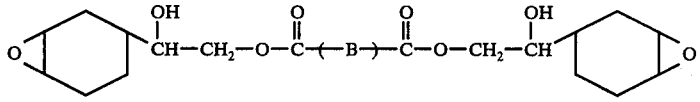

wherein B is a polymeric backbone comprising carbon-carbon linkages and defined in detail heretofore.

Catalysts are not required for manufacture of the cycloaliphatic epoxy-terminated liquid polymers, but may be used. Suitable catalysts include chromium [III] bis-3,5-di-isopropylsalicylate, triphenylphosphine, stannous octoate and the like. A solvent is not required for the reaction but may be used. Suitable solvents include those described heretofore in connection with preparation of an amine-terminated liquid polymer.

Many types of mixing apparatus can be used in the reaction, including turbine stirrers as well as propeller mixers. Reaction components can be combined in any order. The reaction mixture may be heated (or refluxed if a solvent is used) at a temperature from about 80° C. to about 150° C., typically for about 1 to 6 hours.

THERMOPLASTIC, THERMOSETTING ELASTOMERIC COMPOSITIONS

The compositions of this invention comprise (A) 1 equivalent weight of at least one cycloaliphatic epoxy resin described hereinafter, (B) from about 0.05 to about 0.5 equivalent weight of at least one amine-terminated liquid polymer described heretofore and (C) from about 0.4 to about 1.5 equivalent weight of at least one anhydride described hereinafter. Compositional properties may be varied widely by using varying amounts of amine-terminated liquid polymer. The anhydride serves as both a chain extender and crosslinker.

The compositions of this invention can be reacted partially to a thermoplastic, elastomeric intermediate stage (B-stage). The B-stage is believed to be a condition of the compositions where amine-anhydride reaction is substantially complete (mostly by chain extension), but the compositions are still melted or softened by heat, i.e., they are still thermoplastic elastomers. Some cycloaliphatic epoxides such as 3,4-epoxycyclohexylmethyl-(3,4-epoxy)cyclohexane carboxylate may produce tack-free B-stage compositions, while the cycloaliphatic epoxy-terminated liquid polymers described heretofore may produce tacky B-stage compositions. The B-stage compositions may be heated to form a flowable adhesive material curable to a thermoset C-stage upon further heating. By C-stage is meant a tack-free final stage where crosslinking is substantially completed, and the composition is a thermoset elastomer (i.e., substantially fused and insoluble but still elastomeric).

Cycloaliphatic epoxy resins suitable as component (A) in the compositions of this invention contain at least an average of about 1.7 epoxy groups per molecule, more preferably from about 1.7 to about 3 epoxy groups per molecule, and even more preferably from about 1.7 to about 2.3 epoxy groups per molecule. By cycloaliphatic epoxy resin is meant a resin in which at least one oxirane group is itself part of a cycloaliphatic ring structure. The cycloaliphatic epoxy resins may be liquids or low-melting solids but are preferably liquids having a bulk viscosity from about 100 centipoises to about 2,000,000 centipoises (measured using a Brookfield RVT viscometer at 25° C.). The cycloaliphatic epoxy resins can have an epoxy equivalent weight (gram molecular weight per epoxy group) from about 70 to about 6,000, more preferably from about 70 to about 2,000. Suitable cycloaliphatic epoxy resins include 4-(1,2-epoxyethyl)-1,2-epoxycyclohexane, 1,2-8,9-diepoxy-p-menthane, 2,2-bis(3,4-epoxycyclohexyl)propane, 1,2-5,6-diepoxy-4,7-hexahydromethanoindane, 1,2-epoxy-6-(2,3-epoxypropoxy)hexahydro-4,7-methanoindane, p-(2,3-epoxy)cyclopentylphenyl-2,3-epoxypropyl ether, 1-(2,3-epoxypropoxy)phenyl-5,6-epoxyhexahydro-4,7-methanoindane, 3,4-epoxycyclohexylmethyl-(3,4-epoxy)cyclohexane carboxylate, 3,4-epoxy-6-methylcyclohexylmethyl-4-epoxy-6-methylcyclohexane carboxylate, 2-(3,4-epoxy)cyclohexyl-5,5-spiro(3,4-epoxy)-cyclohexane-m-dioxane, bis(3,4-epoxy-6-methylcyclohexylmethyl)adipate, and the like. Also suitable are the cycloaliphatic epoxy-terminated liquid polymers described heretofore.

More preferably at least two epoxy groups, even more preferably two epoxy groups, are themselves part of a cycloaliphatic ring structure. Examples of more preferred cycloaliphatic epoxy resins include 2,2-bis(3,4-epoxycyclohexyl)propane, 3,4-epoxycyclohexylmethyl-(3,4-epoxy)cyclohexane carboxylate, 3,4-epoxy-6-methylcyclohexylmethyl-4-epoxy-6-methylcyclohexane carboxylate, 2-(3,4-epoxy)cyclohexyl-5,5-spiro(3,4-epoxy)-cyclohexane-m-dioxane, bis(3,4-epoxy-6-methylcyclohexylmethyl)adipate and the like. Excellent results were obtained using 3,4-epoxycyclohexylmethyl-(3,4-epoxy)cyclohexane carboxylate and the cycloaliphatic epoxy-terminated liquid polymers described heretofore.

Non-cycloaliphatic epoxy resins were found to be unsuitable as component (A) in this invention because an intermediate or B-stage could not be produced using them. By non-cycloaliphatic epoxy resin is meant a resin in which no oxirane group is part of a cycloaliphatic ring structure. Instead all oxirane groups are separate 3-member rings

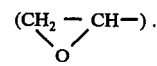

Examples of unsuitable non-cycloaliphatic epoxy resins include a diglycidyl ether of bisphenol A sold under the trademark "Epon 828" by Shell Chemical Company, 1,4-butanediol diglycidyl ether sold under the trademark "Araldite RD-2" by Ciba-Geigy Chemical Company, and the like.

Anhydrides suitable as component (C) in the compositions of this invention may contain from 4 to 24 carbon atoms. The anhydrides are preferably liquids or low-melting solids. Examples of suitable anhydrides include maleic anhydride, succinic anhydride, phthalic anhydride, hexahydrophthalic anhydride, dodecenyl succinic anhydride, bicyclo[2.2.1]hept-5-ene-methyl-2,3-dicarboxylic acid anhydride, and the like. Excellent results were obtained using hexahydrophthalic anhydride, dodecenyl succinic anhydride, and bicyclo[2.2.1]hept-5-ene-methyl-2,3-dicarboxylic acid anhydride.

The compositional components described heretofore can be mixed using mixing kettles, Henschel mixers, ink mills, Banbury mixers, or the like. Standard mixing techniques can be used. Heating the mixture up to about 150° C. may be helpful to obtain dissolution and uniform dispersion of the materials, but such heating causes the compositions to cure much more rapidly. The reaction mixture is generally castable before curing and can be centrifugally cast, roto-casted or poured into stationary trays or molds. The reaction mixture can also be used for liquid injection molding (LIM), also called reactive injection molding (RIM). The latter process may be substantially more economical than conventional injection molding and is becoming well known.

Reaction of the compositions of this invention to a B-stage may be done by heating the reactive components at a temperature typically from about 25° C. to about 180° C., more preferably from about 50° C. to about 150° C. An incipient B-stage of the components generally occurs in about 20 minutes to about 1 hour at 120° C., and a tack-free state may be reached in as little as about 20 minutes at that temperature. Shelf life of the B-stage material is excellent and is often 6 months or more. Curing to a C-stage may be done by heating the B-stage material at a temperature from about 120° C. to about 160° C., e.g., at about 150° C. for about 20 minutes to about 1 hour.

The B-stage compositions can be calendered at about 45° C. to films of desired width and thickness useful in belt and hose laminate construction. The tack-free films can be (1) compressed between layers of rubber compounds and/or fabrics to make belts or hoses or the like, and (2) heated to a flowable, tacky state. (3) The films cure to the C-stage upon heating as described heretofore an exhibit excellent adhesive and cohesive properties. Film thickness may vary widely from 0.1 in or less to 1 inch or more.

Alternatively, the B-stage compositions can be size-reduced by methods known in the art, such as granulating, chopping or the like. The size-reduced compositions can be milled, extruded, injection molded, calendered, Banbury mixed or the like. Compounding ingredients can be blended with the size-reduced B-stage compositions before or during milling, Banbury mixing or the like. Standard levels of these ingredients are used, such levels being well known in the art.

Examples of compounding ingredients include reinforcing fillers such as carbon blacks, metal carbonates and silicates, and glass, asbestos, and textile fibers; non-reinforcing fillers such as titanium dioxide, silica and the like; colorants such as metal oxides and metal sulfides, and organic colorants; lubricants and plasticizers such as petroleum oils, castor oil, glycerin, silicones, aromatic and paraffinic oils, and alkyl and aromatic phthalates, sebacates, trimellitates, and the like; and antioxidants and stabilizers such as phenyl-$\beta$-naphthylamine, 2,6-di-t-butyl paracresol, 2,2'-methylenebis-(4-ethyl-6-t-butyl phenol), 2,2'-thiobis-(4-methyl-6-t-butyl phenol), 4,4'-butylidenebis-(6-t-butyl-m-cresol), tris-(3,5-di-t-butyl-4-hydroxybenzyl)isocyanurate, hexahydro-1,3,5-tris-$\beta$-(3,5-di-t-butyl-4-hydroxyphenyl)propionyl triazine, tetrakismethylene-3(3',5'-di-t-butyl-4'-hydroxyphenyl)propionate methane, distearyl thiodipropionate, tri(nonylated phenyl) phosphite, and the like. Peroxide curing agents such as dicumyl peroxide and the like may also be used.

Other suitable compounding ingredients include sulfur-containing accelerators. Examples of suitable accelerators include metal salts of dialkyl, diaryl and alkaryl dithiocarbamates such as bismuth, copper, lead and zinc dimethyl dithiocarbamates, cadmium, selenium, tellurium and zinc diethyl dithiocarbamates, sodium and zinc dibutyl dithiocarbamates, zinc ethyl phenyl dithiocarbamate, zinc dibenzyl dithiocarbamate, and the like; other dithiocarbamates such as piperidinium pentamethylene dithiocarbamate, N-cyclohexylethyl ammonium cyclohexylethyl dithiocarbamate, N-pentamethyleneammonium-N-pentamethylene dithiocarbamate, and the like; benzothiazoles such as 2-mercaptobenzothiazole and the zinc salt thereof, 2,2'-benzothiazyl disulfide, 2-morpholinothiobenzothiazole, 2-(2,6-dimethyl-4-morpholinothio)benzothiazole, and the like; benzothiazolesulfenamides such as N-diethyl-2-benzothiazyl sulfenamide, N-t-butyl-2-benzothiazole sulfenamide, N-cyclohexyl-2-benzothiazole sulfenamide, N-oxydiethylene-2-benzothiazole sulfenamide, and the like; and thiuram sulfides such as tetramethyl thiuram disulfide, tetraethyl thiuram disulfide, dimethyl diphenyl thiuram disulfide, dipentamethylene thiuram hexasulfide, and the like. Excellent results were obtained using N-t-butyl-2-benzothiazole sulfenamide and N-cyclohexyl-2-benzothiazole sulfenamide.

The B-stage compositions of this invention may be compounded by milling, Banbury mixing or the like with a wide variety of other organic polymeric materials. Such materials are typically used in amounts from 0 to about 1,000, more preferably 0 to 200 parts by weight or more per 100 parts by weight of B-stage composition. Such materials include natural rubber, cis-polyisoprene, cis-polybutadiene (CB), acrylonitrile-butadiene-styrene copolymers (ABS), butadiene-acrylonitrile rubbers (NBR), isoprene-acrylonitrile rubbers, butadiene-styrene rubbers (SBR), isoprene-styrene copolymers, polychloroprene (neoprene), nylon and the like. Other suitable polymeric materials include isoprene-isobutylene (butyl) rubbers, copolymers of conjugated dienes with lower alkyl and alkoxy acrylates, ethylene-propylenediene-polymers (EPDM), polyurethanes such as those described in Schollenberger U.S. Pat. Nos. 2,871,218 and 2,899,411, and the like. Mixtures of organic polymeric materials may also be used.

The compositions of this invention before or in a B-stage can be used in so-called "prepreg" formulations, i.e., in woven or non-woven fabrics impregnated by the compositions. Suitable fabrics include organics such as polyesters, Kevlar, nylon, cotton, wool and the like, and inorganics such as glass, brass, steel and the like. The fabrics may be in sheet, yarn or cord form or the like.

A wide variety of surface materials may be coated, covered, puttied, patched or the like using the compositions of this invention before or in a B-stage. Such materials include natural rubber, cis-polyisoprene, cis-polybutadiene (CB), acrylonitrile-butadiene-styrene copolymers (ABS), butadiene-acrylonitrile rubbers (NBR), isoprene-acrylonitrile rubbers, butadiene-styrene rubbers (SBR), isoprene-styrene copolymers, polychloroprene (neoprene), nylon and the like, and mixtures thereof. Other suitable surface materials include isoprene-isobutylene (butyl) rubbers, copolymers of conjugated dienes with lower alkyl and alkoxy acrylates, ethylene-propylene-diene polymers (EPDM), polyurethanes such as those described in Schollenberger U.S. Pat. Nos. 2,871,218 and 2,899,411, and the like, and mixtures thereof. Still other suitable surface materials include Kevlar, wood, concrete, stainless steel, glass, ceramic tile, tin, and anti-fouling coverings such as those described in U.S. Pat. No. 3,426,473.

"Prepreg" formulations and/or the coated or covered surfaces just described can be pressed together in layers with the compositions of this invention (before or in the B-stage) between layers to form laminate structures. Curing of the compositions to bond the layers together may be performed simultaneously with or after pressing. The laminates may comprise a widely varied number of layers (typically two to 10 layers) with B-stage adhesive between each layer, e.g., a rubber-adhesive-fabric-adhesive-rubber structure. Alternatively, the B-stage adhesive and organic polymeric material described heretofore may be compounded together before lamination in order to reduce the number of layers in the laminate. For example, a 5-layer laminate [rubber-adhesive-fabric-adhesive-rubber] may be replaced by a simpler 3-layer laminate having this structure:

Layer 1 — compounded rubber and adhesive
Layer 2 — fabric
Layer 3 — compounded rubber and adhesive.

Such laminates containing compounded rubber-adhesive layer(s) tend to have greater adhesive and cohesive strength than laminates in which rubber and adhesive are separate.

The following examples illustrate the present invention more fully.

EXAMPLES

Materials

The amine-terminated liquid polymer used in the following examples was prepared readily by following the procedures described in detail heretofore using N-(2-aminoethyl)-piperazine in the amine-termination reaction. The amine-terminated liquid polymer, identified as ATBN, was an amine-terminated poly(butadiene/acrylonitrile) co-polymer having an acrylonitrile content of about 17% by weight of polymer, a viscosity at 27° C. of about 130,000 – 250,000 cps., a number average molecular weight of about 3,000 – 4,400, and an amine ($-NH_2$) equivalent weight of about 1500 – 2200.

The carboxyl-terminated liquid polymer, identified as CTBN and used for preparing ETBN as well as for comparison purposes in Examples 25–27, was prepared by the method of U.S. Pat. No. 3,285,949. The CTBN was a carboxyl-terminated poly(butadiene/acrylonitrile) co-polymer having an acrylonitrile content of about 17% by weight of polymer, a viscosity at 27° C. of about 80,000 – 200,000 cps. and a number average molecular weight of about 2,500 – 3,500.

One cycloaliphatic epoxy resin used in making B-stage and C-stage compositions was 3,4-epoxycyclohexylmethyl-(3,4-epoxy)cyclohexane carboxylate having an epoxy equivalent weight of about 137 and a viscosity at 25° C. of about 350–450 cps. The latter resin is sold under the trademark "Bakelite ERL-4221" by Union Carbide Corporation.

Another cycloaliphatic epoxy resin used in preparing B-stage and C-stage compositions was a cycloaliphatic epoxy-terminated liquid poly(butadiene/acrylonitrile), identified heretofore as ETBN and prepared as follows. A 12-liter, 3-neck flask was cleaned thoroughly, rinsed and dried with a dry nitrogen purge. The flask was equipped with thermocouples (both inside the flask and between the flask and heating mantle) and with a stirrer. The flask was purged continuously with dry nitrogen gas. 6,800 grams of a carboxyl-terminated liquid polymer (CTBN) described heretofore was charged to the flask and heated to about 84° C. with stirring. At that point 1457 grams of vinylcyclohexene dioxide (sold under the trademark "Bakelite ERL-4206" by Union Carbide Corporation) was charged to the flask. About 5.5 equivalents vinylcyclohexene dioxide was used per equivalent of carboxyl-terminated liquid polymer. Heating and stirring of the reaction mixture was continued for about 2 hours at about 120° C. Immediately thereafter a 20mm Hg vacuum was drawn on the reaction mixture in order to remove some excess vinylcyclohexene dioxide and other volatiles. The reaction product, a cycloaliphatic epoxy-terminated liquid poly(butadiene/acrylonitrile), was found to have an epoxy equivalent weight of about 1500 and a Brookfield viscosity (measured using a Brookfield LVT viscometer at 22° C.) of about 174,000 cps. After 7 months storage at room temperature, ETBN viscosity had increased only to about 184,000 cps. measured at 23° C., indicating excellent shelf stability.

Except for the amine-terminated and cycloaliphatic epoxy-terminated liquid polymers (ATBN and ETBN, respectively) described in detail heretofore, the materials used in the following examples are known commercial materials and are readily available.

TEST METHODS

Physical testing of the compositions of this invention was performed according to the following procedures. Modulus, tensile strength and ultimate elongation of elastomeric materials were determined at 25° C. according to ASTM D412 using Die C dumbell samples except where noted; in the latter cases 4-inch mean perimeter oval samples were used. Gehman freeze point was tested according to ASTM D1053. Compression set was measured according to ASTM D395B at 100° C. for 70 hours. Tear resistance was tested according to ASTM D624 using Die C. Pico abrasion resistance was measured according to ASTM D2228 using a 5.5kg weight, a 60 rpm speed and 80 revolutions. Abrasion index was calculated according to S11.3 of the latter procedure. Durometer hardness was measured according to ASTM D676 using a Shore Type A durometer and a one-second identation hardness time interval. $T_1$ and $T_2$ were tested using a B.F. Goodrich Dynamic Extrusion Rheometer [J. Elastomerics, Vol. 5, p. 222 (October 1973)]. 180° Peel strengths of rubber-to-rubber or rubber-to-fabric laminates were tested using a 1 in. × 6 in. sample pulled on an Instron tensile tester at 1 inch/minute.

EXAMPLE 1

300 grams ATBN was heated in a quart jar to 120° C. under vacuum (about 100 mm Hg) with stirring. 100 grams each of Bakelite ERL-4221 and molten (60° C.) hexahydrophthalic anhydride was added to the ATBN, and stirring was continued for 10 minutes. The mixed batch was poured onto a Teflon-lined 6 in. × 9 in. pan and was heated in a circulating air oven at about 150° C. for about 15 minutes. The mixture thickened during this time and reached a viscosity of about 2,000,000 cps. Thereafter the batch was cooled to room temperature. A dry, rubbery B-stage material resulted. It was found to have initially a $T_1$ of about $-5°$ C. and a $T_2$ of about 75° C. After aging about 6 months at room temperature, it was found to have a $T_1$ of about 5° C. and a $T_2$ of about 85° C. This data indicates that the B-stage material had excellent shelf stability.

The B-stage material was cured completely to a C-stage material by placing it in a pan and heating it in an oven at about 150° C. for about 25 minutes.

EXAMPLE 2

1800 grams ATBN was heated in a gallon jar to 145° C. with occasional stirring. 600 grams each of Bakelite ERL-4221 and molten (60° C.) hexahydrophthalic anhydride was added to the ATBN, and stirring was continued for 2.5 minutes at about 120° C. Three such batches were prepared and poured consecutively onto casting paper covering a conveyor belt heated to about 140° – 145° C. Thickness of the mixture after pouring was about 1/6 inch, and total residence time on the hot belt was about 12 minutes. Cooling of the mixture was performed by passing it over a belt cooling zone. A dry, rubbery B-stage material resulted.

EXAMPLES 3–6

In each of four examples 360 grams ATBN was heated in a quart jar to 80° C. under vacuum (about 100 mm Hg) with stirring. 120 grams each of Bakelite ERL-4221 and molten (60° C.) hexahydrophthalic anhydride was added to the ATBN, and stirring was continued for varying times listed in Table I. The batch was poured immediately thereafter into a centrifugal caster at 120° C. and spun at about 120 rpm until cool. A dry, rubbery B-stage material resulted having $T_1$ and $T_2$ values listed in Table I.

Immediately after mixing was completed, small samples of each batch were also heated in a circulating air oven at 150° C. until a complete cure (C-stage) was reached. Cure times are listed in Table I.

TABLE I

| Ex. | Mixing Time | | BFG Dynamic Extrusion Rheometer Test on B-stage Material | | Time to C-stage Cure at 150° C. after Mixing |
|---|---|---|---|---|---|
| | | | $T_1$ | $T_2$ | |
| 3 | 5 minutes | - no oil bath | None | 48° C. | 50 minutes |
| 4* | 7 minutes | -exotherm reached 120° C. before pouring | None | 50° C. | 40 minutes |
| 5* | 20 minutes | -exotherm reached 130° C. before pouring | None | 49° C. | 35 minutes |
| 6** | 30 minutes | -exotherm reached 140° C. before pouring | 0° C. | 75° C. | 20 minutes |

*Mixing vessel was immersed in oil bath maintained at 120° C.
**Sample 6 was heated 30 minutes at 65° C. while spinning and thereafter cooled.

EXAMPLES 7 – 12

Examples 7-12 demonstrate properties of the finally cured (C-stage) compositions of this invention. The general mixing and pouring procedure of example 1 was used.

More specifically, examples 7-12 in Table II demonstrate the effects of varying ATBN amounts on C-stage compositional properties. In general, increasing ATBN amount was found to decrease modulus, tensile strength, compression set, tear resistance, and hardness, while elongation, Gehman Freeze point and abrasion resistance increased.

TABLE II

| Example | 7* | 8* | 9* | 10* | 11* | 12* |
|---|---|---|---|---|---|---|
| Recipe | | | | | | |
| Bakelite ERL-4221, Wt. Parts | 100 | 100 | 100 | 100 | 100 | 100 |
| ATBN, Wt. Parts | 200 | 300 | 350 | 400 | 450 | 500 |
| Hexahydrophthalic Anhydride, Wt. Parts | 100 | 100 | 100 | 100 | 100 | 100 |
| Test Data | | | | | | |
| Cure Cycle, ° C./hrs. | ** | *** | *** | *** | ** | ** |
| 100% Modulus, psi | — | 1592 | 1053 | 758 | 465 | 208 |
| 200% Modulus, psi | — | — | — | 892 | 369 | |
| Tensile Strength, psi | 2400 | 1651 | 1350 | 1138 | 914 | 484 |
| Ultimate Elongation,% | 36 | 104 | 135 | 135 | 204 | 255 |
| Gehman Freeze Pt., ° C | −63 | −55 | −56 | −55 | −49 | −47 |
| Compression Set, % | 31.8 | 35.3 | 21.4 | 10.7 | 14.3 | 25.7 |
| Tear Resistance, lbs/in. | 119 | 228 | 209 | 191 | 141 | 94 |
| Pico Abrasion Index | 28 | 21 | 19 | 15 | **** | **** |
| Durometer Hardness, Type A | 96 | 95 | 93 | 90 | 84 | 75 |

*Tested using oval samples.
**Two-stage cure cycle in which the sample was cured first for 2 hours at 120° C. and thereafter for 2 hours at 150° C.
***Two-stage cure cycle in which the sample was cured first for 2 hours at 120° C. and thereafter for 2 hours at 160° C.
****Cut through sample.

EXAMPLES 13 – 16

Examples 13-16 in Table III show minimal effects of cure cycles longer than 4 hours, except on compression set, indicating that optimum cure to the C-stage can be obtained in less than 4 hours. The general mixing and pouring procedure of Example 1 was used.

TABLE III

| Example | 13 | 14 | 15 | 16 |
|---|---|---|---|---|
| Recipe | | | | |
| Bakelite ERL-4221, Wt. Parts | 100 | 100 | 100 | 100 |
| ATBN, Wt. Parts | 300 | 300 | 300 | 300 |
| Hexahydrophthalic Anhydride, Wt. Parts | 100 | 100 | 100 | 100 |
| Test Data | | | | |
| Cure Cycle, ° C/Hrs | 150/3 | 150/4 | 150/5 | 150/6 |
| 100% Modulus, psi* | 982 | 1014 | 1011 | 1021 |
| 100% Modulus, psi** | 227 | 255 | 243 | 271 |
| 200% Modulus, psi* | 1394 | 1504 | 1447 | 1453 |
| 200 % Modulus, psi** | 465 | 520 | 497 | 533 |
| Tensile Strength, psi* | 1772 | 1886 | 1817 | 1826 |
| Tensile Strength, psi** | 490 | 555 | 537 | 575 |
| Ultimate Elongation, %* | 253 | 250 | 251 | 252 |
| Ultimate Elongation, %** | 205 | 207 | 207 | 210 |
| Gehman Freeze Pt., ° C. | −61 | −65 | −67 | −62 |
| Compression Set, % | 39.5 | 31.9 | 23.1 | 18.6 |
| Tear Resistance, lbs/in. | 286.7 | 304.7 | 298.4 | 301.1 |
| Pico Abrasion Index | 30 | 29 | 30 | 30 |
| Durometer Hardness, Type A | | | | |

*Tested at 25° C.
**Tested at 80° C.

EXAMPLES 17 – 21

Examples 17-19 and 20-21 in Table IV demonstrate effects of varying hexahydrophthalic anhydride amounts and dioctyl phthalate amounts respectively on C-stage compositional properties. The general mixing and pouring procedure of Example 1 was used.

TABLE IV

| Example | 17 | 18 | 19 | 20 | 21 |
|---|---|---|---|---|---|
| Recipe | | | | | |
| Bakelit ERL-4221, | 100 | 100 | 100 | 100 | 100 |
| ATBN, Wt. parts | 300 | 300 | 300 | 150 | 150 |
| Hexahydrophthalic Anhydride, Wt. Parts | 60 | 80 | 120 | 100 | 100 |
| Dioctyl Phthalate, Dioctyl Wt. Parts | — | — | — | 10 | 10 |
| Test Data | | | | | |
| Cure Cycle, ° C/Hrs. | * | * | * | ** | ** |
| 100% Modulus, psi | 162 | — | 1680 | — | — |
| 200% Modulus, psi | 245 | — | — | — | — |
| Tensile Strength, psi | 631 | 1609 | 1866 | 2906 | 2576 |
| Ultimate Elongation | 410 | 392 | 123 | 28 | 26 |
| Gehman Freeze pt., ° C | — | −60 | — | — | — |
| Compression Set, % | 32.6 | 44.0 | 59.4 | 100 | 100 |
| Tear Resistance, lbs/in. | 72.9 | 277.5 | 283.4 | 153.2 | 100.6 |
| Pico Abrasion Index | *** | 45 | 28 | 33 | 28 |

*Two-stage cure cycle in which the sample was cured first for 2 hours at 120° C. and thereafter for 2 hours at 150° C.
**Two-stage cure cycle in which the sample was cured first for 2 hours at 120° C. and thereafter for 2 hours at 160° C.
***Cut through sample.

EXAMPLES 22 – 27

Examples 22-27 in Table V demonstrate the effects of ATBN in comparison to CTBN on C-stage compositions of this invention. CTBN-containing compositions could not be used to prepare a B-stage material. Instead, the CTBN-containing compositions cured directly to a C-stage. N,N-dimethylbenzylamine was used as an accelerator in Examples 25–27. The general mixing and pouring procedure of Example 1 was used.

TABLE V

| Example | 22* | 23* | 24* | 25* | 26* | 27* |
|---|---|---|---|---|---|---|
| Recipe |  |  |  |  |  |  |
| Bakelite ERL-4221, Wt. parts | 100 | 100 | 100 | 100 | 100 | 100 |
| ATBN, Wt. Parts | 200 | 300 | 400 | — | — | — |
| CTBN Wt. Parts | — | — | — | 200 | 300 | 400 |
| Hexahydrophthalic Anhydride, Wt. Parts | 100 | 100 | 100 | 100 | 100 | 100 |
| Ethylene Glycol, Wt. Parts | — | — | — | 1.5 | 1.5 | 1.5 |
| N,N-dimethylbenzlamine, Wt. Parts | — | — | — | 1.0 | 1.0 | 1.0 |
| Test Data |  |  |  |  |  |  |
| Cure Cycle, ° C/Hrs. | ** | ** | ** | ** | ** | ** |
| 100% Modulus, psi | — | 1592 | 758 | — | — | 1592 |
| 200% Modulus, psi | — | — | — | — | — | — |
| Tensile Strength | 2400 | 1651 | 1138 | 2241 | 1476 | 1651 |
| Ultimate Elongation,% | 36 | 104 | 135 | 365 | 77 | 104 |
| Gehman Freeze Pt. ° C. | −63 | −55 | −55 | −59 | −54 | −55 |
| Compression Set, % | 31.8 | 35.3 | 10.7 | 25.9 | 45.0 | 35.3 |
| Tear Resistance, lbs/in. | 119 | 228 | 191 | 219 | 130 | 228 |
| Pico Abrasion Index | 28 | 21 | 15 | 23 | *** | 21 |
| Durometer Hardness, Type A | 96 | 95 | 90 | 95 | 95 | 95 |

*Tested using oval samples.
**Two-stage cure cycle in which the sample was cured first for 2 hours at 120° C. and thereafter for 2 hours at 160° C.
***Cut through sample.

EXAMPLES 28–31

Examples 28–30 in Table VI demonstrate the effects of varying amounts of bicyclo[2.2.1] hept-5-ene-methyl-2,3-dicarboxylic acid anhydride on B-stage compositional properties. The general mixing and pouring procedure of Example 1 was used. An excellent result was also obtained using dodecenylsuccinic anhydride in place of bicyclo[2.2.1] hept-5-ene-methyl-2,3-dicarboxylic acid anhydride, as shown in example 31 in Table VI.

TABLE VI

| Example | 28 | 29 | 30 | 21 |
|---|---|---|---|---|
| Bakelite ERL-4221, Wt. Parts | 100 | 100 | 100 | 100 |
| ATBN, Wt. Parts | 300 | 300 | 300 | 300 |
| Bicyclo[2.2.1]-hept-5-ene-methyl-2,3-dicarboxylic acid anhydride, Wt. Parts | 104 | 117 | 130 | — |
| Dodecenylsuccinic Anhydride, Wt. Parts | — | — | — | 175 |
| Test Data |  |  |  |  |
| Cure Time to B-stage at 120° C., Hrs. | 2 | 1.25 | 1.1 | 0.9 |
| Cure Time to C-stage at 150° C. from B-Stage, Hrs. | 0.75 | 0.75 | 0.5 | 0.1 |
| $T_1$ of B-stage Material, ° C. | −15 | — | 30 | — |
| $T_2$ of B-stage Material, ° C. | 83 | 101 | 92 | — |

EXAMPLES 32 – 37

Examples 32–37 in Table VII demonstrate the effects of varying amounts of ATBN and ETBN in B-stage and C-stage compositions of this invention.

TABLE VII

| Example | 32 | 33 | 34 | 35 | 36 | 37 |
|---|---|---|---|---|---|---|
| Recipe |  |  |  |  |  |  |
| Bakelite ERL-4221, Wt. Parts | 100 | 100 | 100 | 100 | 100 | 100 |
| ATBN, Wt. Parts | 100 | 100 | 150 | 200 | 200 | 300 |
| Hexahydrophthalic Anhydride, Wt. Parts | 100 | 100 | 100 | 100 | 100 | 100 |
| ETBN, Wt. | | | | | | |

TABLE VII-continued

| Example | 32 | 33 | 34 | 35 | 36 | 37 |
|---|---|---|---|---|---|---|
| B-Stage Test Data |  |  |  |  |  |  |
| Cure Time, ° C./Hrs. | 120/1 | 120/1 | 120/1 | 120/1 | 120/1 | 120/1 |
| $T_1$ after 3 mos. at 22° C. | — | −18 | — | — | — | — |
| $T_2$ after 3 mos. at 22° C. | 111 | 91 | 102 | 103 | 95 | 92 |
| C-Stage Test Data |  |  |  |  |  |  |
| Cure cylce, ° C./Hrs. | * | * | * | * | * | * |
| 100% Modulus, psi | 1194 | 442 | 1171 | 1030 | 394 | 427 |
| 200% Modulus, psi | — | 1132 | — | 1700 | 696 | 661 |
| Tensile strength, psi | 1740 | 1230 | 1869 | 1909 | 1225 | 1344 |
| Ultimate Elongation, % | 144 | 208 | 167 | 214 | 296 | 366 |
| Gehman Freeze Pt. ° C. | −53 | −49 | −58 | −62 | −46 | −48 |
| Compression Set, % | 27.6 | 22.2 | 26.7 | 29.7 | 29.5 | 29.1 |
| Tear Resistance, lbs./in. | 162 | 84 | 195 | 229 | 116 | 163 |
| Pico Abrasion Index | 20 | ** | 18 | 24 | 10 | 21 |
| Durometer Hardness, Type A | 89 | 70 | 91 | 92 | 76 | 81 |

*Two-stage cure cycle in which the sample was cured first for 1 hour at 120° C. and thereafter for 2 hours at 150° C.
**Cut through sample.

EXAMPLES 38 – 40

Examples 38–40 in Table VIII demonstrate the effects of partial and total replacement of Bakelite ERL-4221 by larger amounts of ETBN than in Examples 32–37. The B-stage compositions were found to have tacky surfaces, while C-stage compositions were dry and tack-free.

TABLE VIII

| Example | 38 | 39 | 40 |
|---|---|---|---|
| Recipe |  |  |  |
| Bakelite ERL-4221, Wt. Parts | — | — | 500 |
| ATBN, Wt. Parts | 300 | 300 | 300 |
| Hexahydrophthalic Anhydride, Wt. Parts | 100 | 100 | 550 |
| ETBN, Wt. Parts | 1200 | 1400 | 800 |
| B-stage Test Data |  |  |  |
| Cure Cycle, ° C/Hrs. | 120/0.25 | 120/0.25 | 120/0.3 |
| Surface Condition | Tacky | Tacky | Tacky |
| C-Stage Test Data |  |  |  |
| Cure Time to C-Stage from B-Stage, ° C./Hrs. | 150/0.4 | 150/0.4 | 150/0.4 |
| Surface Condition | Dry | Dry | Dry |

EXAMPLE 41

Example 41 demonstrates utility of a composition of this invention compounded with rubber and used as an adhesive in a rubber-fabric-rubber laminate. A B-stage adhesive was prepared using the following recipe:

| Material | Weight Parts |
|---|---|
| Bakelite ERL-4221 | 100 |
| ATBN | 300 |
| Hexahydrophthalic Anhydride | 100 |

The general mixing, pouring and heating procedure of Example 1 was used to prepare the B-stage adhesive.

The B-stage adhesive just described was compounded with an ethylene-propylene-butadiene polymer (EPDM) having a Mooney viscosity of 50–62 (ML-8 at 100° C.). The following recipe was used:

| Material | Weight Parts |
|---|---|
| B-stage Adhesive | 100 |
| EPDM | 40 |
| N-t-butyl-2-benzothiazolesulfenamide | 1 |
| Sulfur treated with $MgCO_3$ | 0.5 |

| Material | Weight Parts |
|---|---|
| -continued | |
| | 141.5 |

Compounding was performed on a 6-inch 3-roll mill at 52° C. with mixing until homogeneity was achieved. A sheet approximately 0.125 inch thick was stripped from the mill and pressed to about a 0.075 inch sheet between Teflon-coated plates using a hydraulic press. Pressing was done at about 120° C. and about 10,000 psi for about 1 minute, and the compounded adhesive sheet was cooled and removed from the press.

A 1 in. × 6 in. laminate was prepared by flanking a sheet of Kevlar fabric with a compounded adhesive sheet on each side of the fabric. The laminate was cured between Teflon-coated plates using a hydraulic press. Pressing was done at 150° C. and about 80 psi for 30 minutes. 180° peel strength of the laminate was found to be about 8 lbs./in. of width.

EXAMPLES 42–45

Examples 43-45 demonstrate utility of the adhesive compositions of this invention compounded with a rubber blend and used as adhesives in rubber-fabric-rubber laminates. The compounded rubber stock itself has adhesive properties, and no separate adhesive layer is Example 41, except that milling temperature was 43° C., and the milled sheet was calendered to about a 0.075-inch sheet. Recipes and test data are set forth in Table IX.

TABLE IX

| Example | 42 | 43 | 44 | 45 |
|---|---|---|---|---|
| B-Stage Adhesive Recipe | | | | |
| Bakelite, ERL-4221, Wt. parts | 100 | 100 | 100 | 100 |
| ATBN, Wt. Parts | 300 | 300 | 300 | 300 |
| Hexahydrophthalic Anhydride, Wt. Parts | 100 | 100 | 100 | 100 |
| Compounded B-Stage Adhesive Recipe | | | | |
| B-Stage Adhesive, Wt. Parts | 100 | 100 | 100 | 100 |
| Butadiene-Acrylonitrile Rubber, Wt. Parts | — | 21.25 | 42.5 | 85 |
| Styrene-Butadiene Rubber, Wt. Parts | — | 3.75 | 7.5 | 15 |
| Carbon Black N-550, Wt.parts | — | 12.5 | 15 | 20 |
| Sulfur, Wt. Parts | — | 1.25 | 1.5 | 2 |
| N-cyclohexyl-2-benzothiazolesulfenamide, Wt. parts. | — | 1.25 | 1.5 | 2 |
| TOTAL WEIGHT | 100 | 140 | 168 | 224 |
| Test Data-Cured Laminate | | | | |
| 180° Peel strength using Kevlar Fabric, lbs./in. width | 10 | 20 | 14 | 9 |
| 180° Peel strength using Polyester Fabric, lbs./in. width | 7 | 17 | 12 | 9 | needed. Example 42 is a control with no adhesive in the compounded rubber; B-stage adhesive is used alone between rubber compound and fabric. Example 43 shows that it is possible to at least double the 180° peel strength of the control by compounding a nitrile-SBR rubber blend with the B-stage adhesive of this invention, but examples 44 and 45 also demonstrate improved adhesion.

The B-stage adhesive was compounded and laminated in the above examples by the procedure used in

EXAMPLES 46–49

Examples 46-49 demonstrate utility of the B-stage compositions of this invention compounded with two different rubbers and other additives and used as adhesives in rubber-fabric-rubber laminates. The compounded rubber stock itself has adhesive properties, and no separate adhesive layer is needed. Examples 46 and 48 are controls wherein the rubber itself contains no adhesive; B-stage adhesive is used alone between rubber compound and fabric. Example 47 demonstrates that it is possible to more than triple the 180° peel strength of control Example 46 by compounding neoprene rubber with the B-stage adhesive of this invention. Example 49 demonstrates that 180° peel strength of control Example 48 can be more than doubled by compounding an EPDM rubber with the B-stage adhesive of this invention.

The B-stage adhesive was compounded and laminated in the above examples by the procedure used in Example 41 except that milling temperature was 120° C. for neoprene and 52° C. for EPDM. Recipes and test data are set forth in Table X.

TABLE X

| Example | 46 | 47 | 48 | 49 |
|---|---|---|---|---|
| B-Stage Adhesive Recipe | | | | |
| Bakelite, ERL-4221, Wt. Parts | 100 | 100 | 100 | 100 |
| ATBN, Wt. Parts | 300 | 300 | 300 | 300 |
| Hexahydrophthalic Anhydride, Wt. Parts | 100 | 100 | 100 | 100 |
| Compounded B-Stage Adhesive Recipe | | | | |
| B-Stage Adhesive, Wt. Parts | 100 | 100 | 100 | 100 |
| Neoprene Rubber, Wt. Parts | — | 25 | — | — |
| thylene-propylene-diene Rubber, Wt. Parts | — | — | — | 25 |
| Carbon Black N-550, Wt. Parts | — | 12.5 | — | 12.5 |
| Sulfur, Wt. Parts | — | 1.25 | — | 1.25 |
| N-cyclohexyl-2-benzothiazolesulfenamide, Wt. Parts | — | 1.25 | — | 1.25 |
| TOTAL WEIGHT | 100 | 140 | 100 | 140 |
| Test Data- Laminate Cured to C-Stage | | | | |
| Rubber Stock used in Laminate | Neoprene | Blend | EPDM | Blend |
| 180° Peel Strength using Kevlar Fabric, lbs./in. width | 3 | 11 | 3 | 8 |
| 180° Peel Strength using Polyester Fabric, lbs./in. width | 3 | 11 | 3 | 6 |

The compositions of this invention are useful as solventless adhesives (alone or compounded with rubber stock or the like) for conveyor belts, hoses, shoes, iron-on clothing patches, and the like. The compositions are also useful as paints, powder coatings, binders for woven or non-woven fibers and cords, and the like.

I claim:

1. A composition comprising:

(A) 1 equivalent weight of at least one cycloaliphatic epoxy resin containing at least an average of about 1.7 epoxy groups per molecule, said resin having an epoxy equivalent weight from about 70 to about 6,000, (B) from about 0.05 to about 0.5 equivalent weight of at least one amine-terminated liquid polymer containing an average from about 1.7 to about 3 amine groups per molecule, said groups being primary, secondary or a mixture thereof, and said polymer having the formula

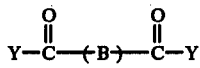

wherein Y is a univalent radical obtained by removing hydrogen from an amine group of an aliphatic, alicyclic, heterocyclic or aromatic amine containing from 2 to 20 carbon atoms and at least two amine groups, at least two of said amine groups being primary, secondary or a mixture thereof, and B is a polymeric backbone comprising carbon-carbon linkages and containing polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

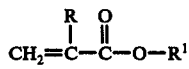

said R being hydrogen or an alkyl radical containing 1 to 3 carbon atoms, and said $R^1$ being hydrogen, an alkyl radical containing 1 to 18 carbon atoms, or an alkoxyalkyl, alkylthioalkyl or cyanoalkyl radical containing 2 to 12 carbon atoms, and (C) from about 0.4 to about 1.5 equivalent weight of at least one anhydride containing from 4 to 24 carbon atoms per molecule.

2. A composition of claim 1 wherein said carbon-carbon linkages comprise at least 90% by weight of total polymeric backbone weight, and said monomer is selected from the group consisting of (a) monoolefins containing 2 to 8 carbon atoms, (b) dienes containing 4 to 8 carbon atoms, and (e) acrylic acids and acrylates having the formula

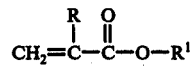

said R being hydrogen or an alkyl radical containing 1 to 3 carbon atoms and said $R^1$ being hydrogen, an alkyl radical containing 1 to 8 carbon atoms, or an alkoxyalkyl, alkylthioalkyl or cyanoalkyl radical containing 2 to 8 carbon atoms.

3. A composition of claim 2 wherein said epoxy resin has an epoxy equivalent weight from about 70 to about 2,000.

4. A composition of claim 3 wherein said vinylidene monomer contains copolymerized therewith from 0% up to about 50% by weight of at least one co-monomer selected from the group consisting of (f) vinyl aromatics having the formula

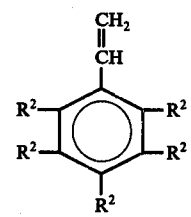

wherein $R^2$ is hydrogen, halogen or an alkyl radical containing from 1 to 4 carbon atoms, (g) vinyl nitriles having the formula

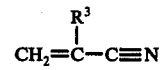

wherein $R^3$ is hydrogen or an alkyl radical containing 1 to 3 carbon atoms, (h) vinyl halides, (i) divinyls and diacrylates, (j) amides of $\alpha,\beta$-olefinically unsaturated carboxylic acids containing 2 to 8 carbon atoms, and (k) allyl alcohol.

5. A composition of claim 4 wherein said amine groups have different reactivities, and said comonomer is selected from the group consisting of (f) said vinyl aromatics and (g) said vinyl nitriles.

6. A composition of claim 5 wherein said amine is at least one N-(aminoalkyl) piperazine, the aminoalkyl group of said amine contains from 1 to 12 carbon atoms, said vinylidene monomer is at least one of said dienes, and said comonomer is at least one of said vinyl nitriles.

7. A composition of claim 6 wherein said cycloaliphatic epoxy resin is a cycloaliphatic epoxy-terminated liquid polymer having the formula

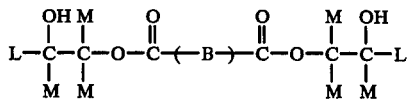

wherein L is a univalent radical obtained by removing a non-cycloaliphatic epoxy group from an epoxy resin containing at least one non-cycloaliphatic epoxy group and at least one cycloaliphatic epoxy group, M is hydrogen or an alkyl group containing from one to four carbon atoms, and B is as defined heretofore.

8. A composition of claim 7 wherein L is a univalent radical obtained by removing a non-cycloaliphatic epoxy group from an epoxy resin containing one non-cycloaliphatic epoxy group and one cycloaliphatic epoxy group.

9. A composition of claim 8 wherein said cycloaliphatic epoxy-terminated liquid polymer has the formula

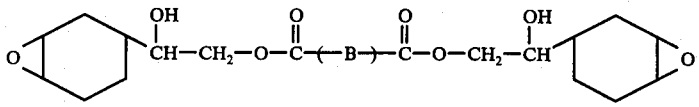

10. A composition of claim 9 wherein said diene is butadiene, said vinyl nitrile is acrylonitrile, and said amine is N-(2-aminoethyl)-piperazine.

11. A composition of claim 10 wherein said anhydride is hexahydrophthalic anhydride.

12. A composition of claim 6 wherein said cycloaliphatic epoxy resin is 3,4-epoxycyclohexylmethyl-(3,4-epoxy)cyclohexane carboxylate.

13. A composition of claim 12 wherein said diene is butadiene, said vinyl nitrile is acrylonitrile, and said amine is N-(2-aminoethyl)piperazine.

14. A composition of claim 13 wherein said anhydride is hexahydrophthalic anhydride.

15. A composition of claim 13 wherein said anhydride is dodecenyl succinic anhydride.

16. A composition of claim 13 wherein said anhydride is bicyclo[2.2.1]hept-5-ene-methyl-2,3-dicarboxylic acid anhydride.

17. A composition of claim 1 in the B-stage of cure.

18. A composition of claim 17 having compounded therewith from 0 to about 1000 parts by weight of at least one other organic polymeric material per 100 parts by weight of B-stage composition.

19. A composition of claim 18 wherein said organic polymeric material is natural rubber, cis-polyisoprene, cis-polybutadiene, an ethylene-propylene-diene polymer, a styrene-butadiene polymer, polychloroprene, a butadieneacrylonitrile polymer, or a mixture thereof.

20. A composition of claim 19 wherein said polymeric material is an ethylene-propylene-diene polymer.

21. A composition of claim 19 wherein said polymeric material is a styrene-butadiene polymer.

22. A composition of claim 19 wherein said polymeric material is polychloroprene.

23. A composition of claim 19 wherein said polymeric material is a butadiene-acrylonitrile polymer.

24. A composition of claim 1 in the C-stage of cure.

25. A laminate structure having as adhesive a composition comprising
(A) 1 equivalent weight of at least one cycloaliphatic epoxy resin containing at least an average of about 1.7 epoxy groups per molecule, said resin having an epoxy equivalent weight from about 70 to about 6,000,
(B) from about 0.05 to about 0.5 equivalent weight of at least one amine-terminated liquid polymer containing an average from about 1.7 to about 3 amine groups per molecule, said groups being primary, secondary or a mixture thereof, and said polymer having the formula

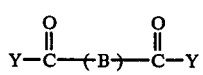

wherein Y is a univalent radical obtained by removing hydrogen from an amine group of an aliphatic, alicyclic, heterocyclic or aromatic amine containing from 2 to 20 carbon atoms and at least two amine groups, at least two of said amine groups being primary, secondary or a mixture thereof, and B is a polymeric backbone comprising carbon-carbon linkages and containing polymerized units of at least one vinylidene monomer having at least one terminal $CH_2=C<$ group, said monomer being selected from the group consisting of (a) monoolefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

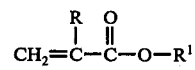

said R being hydrogen or an alkyl radical containing 1 to 3 carbon atoms, and said $R^1$ being hydrogen, an alkyl radical containing 1 to 18 carbon atoms, or an alkoxyalkyl, alkylthioalkyl or cyanoalkyl radical containing 2 to 12 carbon atoms, and
(C) from about 0.4 to about 1.5 equivalent weight of at least one anhydride containing from 4 to 24 carbon atoms per molecule.

26. A laminate structure of claim 25 wherein said carbon-carbon linkages comprise at least 90% by weight of total polymeric backbone weight, and said monomer is selected from the group consisting of (a) monoolefins containing 2 to 8 carbon atoms, (b) dienes containing 4 to 8 carbon atoms, and (e) acrylic acids and acrylates having the formula

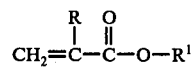

said R being hydrogen or an alkyl radical containing 1 to 3 carbon atoms and said $R^1$ being hydrogen, an alkyl radical containing 1 to 8 carbon atoms, or an alkoxyalkyl, alkylthioalkyl or cyanoalkyl radical containing 2 to 8 carbon atoms.

27. A laminate structure of claim 26 wherein said epoxy resin has an epoxy equivalent weight from about 70 to about 2,000.

28. A laminate structure of claim 27 wherein said vinylidene monomer contains copolymerized therewith from 0% up to about 50% by weight of at least one comonomer selected from the group consisting of (f) vinyl aromatics having the formula

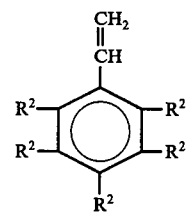

wherein $R^2$ is hydrogen, halogen or an alkyl radical containing from 1 to 4 carbon atoms, (g) vinyl nitriles having the formula $$\underset{R^3}{\underset{|}{CH_2=C-C\equiv N}}$$

wherein R³ is hydrogen or an alkyl radical containing 1 to 3 carbon atoms, (h) vinyl halides, (i) divinyls and diacrylates, (j) amides of α,β-olefinically unsaturated carboxylic acids containing 2 to 8 carbon atoms, and (k) allyl alcohol.

29. A laminate structure of claim 28 wherein said amine groups have different reactivities, and said comonomer is selected from the group consisting of (f) said vinyl aromatics and (g) said vinyl nitriles.

30. A laminate structure of claim 29 wherein said amine is at least one N-(aminoalkyl)piperazine, the aminoalkyl group of said amine contains from 1 to 12 carbon atoms, said vinylidene monomer is at least one of said dienes, and said comonomer is at least one of said vinyl nitriles.

31. A laminate structure of claim 30 wherein said cycloaliphatic epoxy resin is a cycloaliphatic epoxy-terminated liquid polymer having the formula $$L-\underset{\underset{M}{|}}{\overset{\overset{OH}{|}}{C}}-\underset{\underset{M}{|}}{\overset{\overset{M}{|}}{C}}-O-\overset{\overset{O}{\|}}{C}-(B)-\overset{\overset{O}{\|}}{C}-O-\underset{\underset{M}{|}}{\overset{\overset{M}{|}}{C}}-\underset{\underset{M}{|}}{\overset{\overset{OH}{|}}{C}}-L$$

wherein L is a univalent radical obtained by removing a non-cycloaliphatic epoxy group from an epoxy resin containing at least one non-cycloaliphatic epoxy group and at least one cycloaliphatic epoxy group, M is hydrogen or an alkyl group containing from one to four carbon atoms, and B is as defined heretofore.

32. A laminate structure of claim 31 wherein L is a univalent radical obtained by removing a non-cycloaliphatic epoxy group from an epoxy resin containing one non-cycloaliphatic epoxy group and one cycloaliphatic epoxy group.

33. A laminate structure of claim 32 wherein said cycloaliphatic epoxy-terminated liquid polymer has the formula $$O\overset{\triangle}{\underset{}{\bigcirc}}\underset{}{\overset{OH}{\underset{|}{CH}}}-CH_2-O-\overset{\overset{O}{\|}}{C}-(B)-\overset{\overset{O}{\|}}{C}-O-CH_2-\underset{}{\overset{OH}{\underset{|}{CH}}}\overset{\triangle}{\underset{}{\bigcirc}}O$$

34. A laminate structure of claim 33 wherein said diene is butadiene, said vinyl nitrile is acrylonitrile, and said amine is N-(2-aminoethyl)piperazine.

35. A laminate structure of claim 34 wherein said anhydride is hexahydrophthalic anhydride.

36. A laminate structure of claim 30 wherein said cycloaliphatic epoxy resin is 3,4-epoxycyclohexylmethyl-(3,4-epoxy)cyclohexane carboxylate.

37. A laminate structure of claim 36 wherein said diene is butadiene, said vinyl nitrile is acrylonitrile, and said amine is N-(2-aminoethyl)piperazine.

38. A laminate structure of claim 37 wherein said anhydride is hexahydrophthalic anhydride.

39. A laminate structure of claim 37 wherein said anhydride is dodecenyl succinic anhydride.

40. A laminate structure of claim 37 wherein said anhydride is bicyclo[2.2.1]hept-5-ene-methyl-2,3-dicarboxylic acid anhydride.

41. A laminate structure of claim 25 wherein said composition is in the B-stage of cure.

42. A laminate structure of claim 41 wherein said composition has compounded therewith from 0 to about 1,000 parts by weight of at least one other organic polymeric material per 100 parts by weight of B-stage compositions.

43. A laminate structure of claim 42 wherein said organic polymeric material is natural rubber, cis-polyisoprene, cis-polybutadiene, an ethylene-propylenediene polymer, a styrene-butadiene polymer, polychloroprene, a butadiene-acrylonitrile polymer, or a mixture thereof.

44. A laminate structure of claim 43 wherein said polymeric material is an ethylene-propylene-diene polymer.

45. A laminate structure of claim 43 wherein said polymeric material is a styrene-butadiene polymer.

46. A laminate structure of claim 43 wherein said polymeric material is polychloroprene.

47. A laminate structure of claim 43 wherein said polymeric material is a butadiene-acrylonitrile polymer.

48. A laminate structure of claim 25 wherein said composition is in the C-stage of cure.

49. A process comprising
(1) mixing a composition comprising
 (A) 1 equivalent weight of at least one cycloaliphatic epoxy resin containing at least an average of about 1.7 epoxy groups per molecule, said resin having an epoxy equivalent weight from about 70 to about 6,000,
 (B) from about 0.05 to about 0.5 equivalent weight of at least one amine-terminated liquid polymer containing an average from about 1.7 to about 3 amine groups per molecule, said groups being primary, secondary or a mixture thereof, and said polymer having the formula $$Y-\overset{\overset{O}{\|}}{C}-(B)-\overset{\overset{O}{\|}}{C}-Y$$

wherein Y is a univalent radical obtained by removing hydrogen from an amine group of an aliphatic, alicyclic, heterocyclic or aromatic amine containing from 2 to 20 carbon atoms and at least two amine groups, at least two of said amine groups being primary, secondary or a mixture thereof, and B is a polymeric backbone comprising carbon-carbon linkages and containing polymerized units of at least one vinylidene monomer having at least one terminal CH₂=C< group, said monomer being selected from the group consisting of (a) mono-olefins containing 2 to 14 carbon atoms, (b) dienes containing 4 to 10 carbon atoms, (c) vinyl and allyl esters of carboxylic acids containing 2 to 8 carbon atoms, (d) vinyl and allyl ethers of alkyl radicals containing 1 to 8 carbon atoms, and (e) acrylic acids and acrylates having the formula

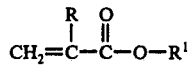

said R being hydrogen or an alkyl radical containing 1 to 3 carbon atoms, and said R¹ being hydrogen, an alkyl radical containing 1 to 18 carbon atoms, or an alkoxyalkyl, alkylthioalkyl or cyanoalkyl radical containing 2 to 12 carbon atoms, and (C) from about 0.4 to about 1.5 equivalent weight of at least one anhydride containing from 4 to 24 carbon atoms per molecule, and (2) curing said composition to the B-stage of cure.

50. A process of claim 49 wherein said composition is advanced to the C-stage of cure.

* * * * *